Patented Dec. 3, 1940

2,223,349

UNITED STATES PATENT OFFICE 2,223,349

PROCESS OF PREPARING HEXAHYDRIC ALCOHOL BORATES

Clarence Bremer, Tamaqua, Pa., assignor to Atlas Powder Company, Wilmington, Del., a corporation of Delaware No Drawing. Application March 17, 1938, Serial No. 196,387

14 Claims. (Cl. 260—462)

This invention relates to a new process of preparing hexahydric alcohol borate polycondensation products (including the alkali metal salts thereof).

An object of this invention is the production of water-soluble resinous polycondensation products of the aliphatic six carbon atom hexahydric alcohols with boric acid or alkali metal (including ammonium) salts of boric acid, or with mixtures of boric acid and alkali metal hydroxide.

A further object of the invention is the production of such compounds in viscous or solid form at a low temperature and in a facile and economical manner.

A further object of the invention is the production of water-soluble resinous derivatives of hexahydric alcohols in which the hydrogen atom of at least one secondary alcohol group has been replaced with a boron radical selected from that group of radicals represented by —BRR'; —BR'R², where R is OH or OM, M being an alkali metal, R' is a bond to the oxygen atom and replaces the hydrogen atom of another secondary alcohol group of the hexahydric alcohol and R² is a bond to the oxygen atom and replaces the hydrogen atom of a third alcohol group of the hexahydric alcohol.

In this specification and in the claims appended thereto by the term "polycondensation" is meant the splitting off of two or more molecules of water in the formation of a condensation product.

When lower polyhydric alcohols such as glycerol or the glycols are heated with boric acid or alkali metal borates to a condensation temperature until two molecules of water of condensation have been split off, the resulting polycondensation product is an anhydrous liquid having a viscosity at 200° F. of less than 1000 centipoises. Thus ammonium glycerol borate having a pH of 4.0 and a viscosity of 891 centipoises at 200° F. and glycerol borate having a viscosity at 200° F. of only 207 centipoises are anhydrous. Heretofore it has been assumed that reaction is complete when the reacting mass has attained a certain viscosity. However, I have found that when a hexahydric alcohol (hexitol) is heated with boric acid or alkali metal borates to a boiling temperature until the mass has a viscosity at 200° F. of less than 2000, say 1000, centipoises the product obtained is not anhydrous and upon cooling is wholly unsatisfactory since it is only slightly reacted and is not a polycondensation product. I have found that in the case of the hexahydric alcohols, it is necessary to heat until a much higher viscosity is attained and until at least two molecules of water of condensation have been eliminated with the condensation of the boric acid compound with at least two secondary alcohol groups of the hexahydric alcohol before a satisfactory product is obtained. Thus when a hexahydric alcohol is heated with boric acid to a temperature at which condensation occurs and until two or more molecules of water of condensation have been removed and an anhydrous product is obtained, the resulting polycondensation product is a water-white resinous, glasslike melt which upon cooling to room temperature solidifies to a hard, easily handled, solid resin. When a hexahydric alcohol is heated with an alkali metal borate or its equivalent, namely a mixture of an alkali metal hydroxide and boric acid, to a condensation temperature for a sufficient period of time to remove two or more molecules of water of condensation and form an anhydrous melt, the resulting polycondensation product has a viscosity above 2000 centipoises at 200° F., and is a highly viscous liquid at room temperature.

In order to produce alkalized boric acid-hexahydric alcohol polycondensation products, as more fully set out below, I may substitute an alkali metal borate for boric acid in the reaction mixture, or I may add the desired amount of an alkali metal hydroxide to the reaction mixture of boric acid and the hexahydric alcohol. The alkalized products thus produced are viscous, resinous products similar in many respects to the non-alkalized products.

In this specification, where pH of a product is referred to, unless otherwise designated, I mean the pH of a 25% aqueous solution prepared by dissolving 25 parts by weight of the product in 75 parts by weight of water.

Clear, resin-like hexitol borates, having a pH of about 2, may be obtained according to the present invention by reacting one mol of sorbitol, mannitol or dulcitol with either one or two mols of boric acid. The reaction of mol for mol ratios, until two mols of water of condensation have been evolved, results in the production of hexitol monoborate dicondensation products, whereas the reaction of one mol of the hexitol with two mols of boric acid until four mols of water of condensation have been evolved, results in the formation of hexitol diborate tetracondensation products.

The borates produced by the present process are suitable for use as coating compositions for paper and textiles; as conditioning agents for paper and textiles; ingredients in cosmetics and hair-waving compounds; ingredients in electrolytic condensers; ingredients in pharmaceutical preparations and adhesives and for many other uses where adhesiveness, relatively high viscosity, good electrical conductivity and hydroscopicity are desirable.

In the preparation of these hexitol borates, the ingredients are preferably dissolved in a relatively large amount of water, say from 4 to 12 mols of water per mol of hexitol present in the reaction mixture. The use of large proportions of water in the reaction mixture is advantageous since the water serves as a vehicle and facilitates mixing and reaction of the ingredients. The mixture thus obtained is then heated at a temperature of from 100 to 120° C. for a sufficient period of time to drive off the water which must be removed to form the desired polycondensation product. In order to facilitate evaporation of water formed in the reaction, it is sometimes preferable to heat the reactants in an oven to insure uniform and equal distribution of heat throughout the entire mass. Thus with a mixture of one mol of hexitol, one mol of boric acid and 10 mols of water, removal from the reaction mixture of about 12 mols of water results in the production of the monoborate discondensation product.

While it is preferable to carry out the reaction between the hexitol and the boric acid or alkali metal borate in the presence of an excess of water of solution it is to be understood that where the mixed melting point is below the charring point of the ingredients, the water of solution may be reduced in amount or eliminated.

The preparation of alkalized hexitol borate polycondensation products having a pH above 2 is preferably effected by first reacting the boric acid and the hexahydric alcohol and adding at the end of the reaction the amount of alkali metal hydroxide required to adjust the resinous melt to the desired pH. When the alkali metal is present from the beginning of the reaction, the reaction must be carefully controlled as there is a tendency for the reaction product to become charred or discolored, whereas when it is added after the reaction between the hexahydric alcohol and the boric acid, especially if the hexahydric alcohol borate melt is permitted to cool to about 100° C. before addition of the alkali metal hydroxide, this difficulty is minimized.

However, the preparation of hexitol borates having a pH above 2 is not to be considered as limited in this respect. The alkali metal hydroxide may be employed as a starting material in the reaction mixture if so desired, or the alkali metal salts of boric acid, such as ammonium borate, sodium metaborate, sodium tetraborate, sodium perborate, potassium metaborate, lithium metaborate, lithium tetraborate, and the like, may be employed as a starting material in place of all or part of the boric acid. If desired, the ingredients may be reacted in amounts which will result in a product of a pH value above that desired so that final adjustment of pH value can be made downwardly with boric acid. Such downward adjustment of pH value may result in the presence of unreacted boric acid, but ordinarily this is unobjectionable.

Consequently, the invention is not to be considered as limited with respect to the pH value of the product, nor with respect to the manner of obtaining the desired pH value in the products. While in the following description of various embodiments of the invention, the acidic products have been chosen for purposes of illustration, it is to be understood that an alkali metal may be substituted for one or more of the unreacted hydrogen atoms of the boric acid radical of the reaction product without departing from the invention.

In reacting equimolecular quantities of hexitol and boric acid, I find that the first condensation takes place involving two secondary hydroxyl groups and loss of two molecules of water. Further condensation takes place involving one additional hydroxyl group, upon another molecule of water being volatilized during the reaction.

For example, when one mol of sorbitol and one mol of boric acid are reacted, according to my process, until 2 mols of water have been volatilized, a clear, resin-like, sorbitol monoborate dicondensation product is obtained. The structure of this product is:

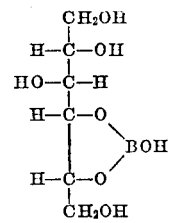

If such a reaction be continued until 3 mols of water have been volatilized, a clear, resin-like sorbitol monoborate tricondensation product is obtained. The structure of the tricondensation product is similar to that of the dicondensation product in that at least two secondary alcohol groups of the sorbitol are involved in the condensation. However, an additional molecule of water is eliminated so that the boric acid is condensed with three instead of two alcohol groups of the sorbitol. It is not known positively whether the third condensation takes place upon a primary or a secondary alcohol group, although the evidence points to the latter.

When one mol of mannitol and one mol of boric acid are reacted, according to the process of this invention, until 2 mols of water have been volatilized, a clear, resin-like mannitol monoborate dicondensation product is obtained, the structure of which is:

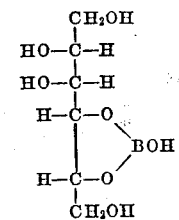

Dulcitol, in the same manner, when reacted with boric acid, forms dulcitol monoborate dicondensation product having a similar structural formula.

If this reaction be continued until between 2 and 3 mols of water have been volatilized, a clear, resin-like mixture of the dulcitol or mannitol monoborate dicondensation product and a dulcitol or mannitol monoborate tricondensation product is obtained. The structure of dulcitol or mannitol tricondensation product is similar to that of the dicondensation product in that at least two secondary alcohol groups of the mannitol or dulcitol are involved in the condensation. Here again, it is not known positively whether the third condensation takes place upon a primary or a secondary alcohol group, although the evidence points to the latter.

In reacting one mol of hexitol with two mols of boric acid, I find that the only condensation which takes place is one involving the loss of four molecules of water, each mol of boric acid causing the loss of two mols of water and the attachment of the boron atom directly to the oxygen atom of two secondary alcohol groups of the hexitol.

Thus, the diborate, tetracondensation products of sorbitol may be prepared by reacting one mol of sorbitol with 2 mols of boric acid until 4 mols of water have been removed. Again, condensation takes place between the secondary alcohol groups of the sorbitol and the boric acid, and no primary alcohol groups of the sorbitol are involved in the condensation. The structure of sorbitol diborate may be written as follows:

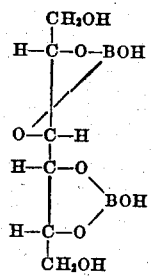

Diborate, tetracondensation products of mannitol and dulcitol may be prepared in a similar manner. The structure of the diborate of mannitol may be written as follows:

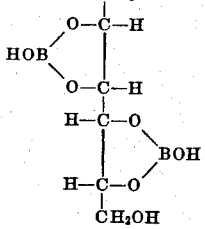

The structure of the diborate of dulcitol, assuming transcondensation has taken place, may be written as follows:

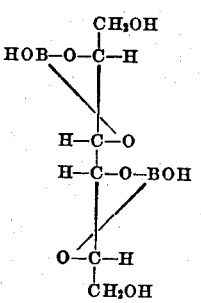

Where sorbitol is referred to herein, unless otherwise designated, it may be either in the form of pure, crystalline, solid sorbitol or in the form of a technical, aqueous sorbitol syrup containing relatively small amounts of ash, sugar, organic acids and other organic compounds, and produced by the reduction of glucose, invert sugar or the like. If desired, sorbitol syrup which has been freed from ash by suitable methods may be used.

In the following non-limiting examples of various embodiments of the invention, the reaction products of 1 mol of the hexitol and 1 mol of boric acid are designated as monoborates, and the reaction products of 1 mol of the hexitol and 2 mols of boric acid are designated as diborates. Where the product was neutralized or partially neutralized, the example specifies the cation used and the pH to which the product was neutralized. The borates are designated further by the terms indicating the degree of condensation. Thus, where two mols of water are lost during the reaction, the product is termed a disondensation product; where three mols of water are lost, it is termed a tricondensation product, and where 4 mols of water are given off, it is termed a tetracondensation product. The viscosities were determined using a Hoeppler viscosimeter.

EXAMPLE 1

*Sorbitol monoborate — Acidic — Dicondensation product*

182 g. (1 mol) of crystalline sorbitol and 62 g. (1 mol) of boric acid were mixed with 180 g. (10 mols) of water. The mixture was heated at 110–115° C. until the water of solution and 2 mols of water of condensation had been volatilized. A clear resinous melt was formed. The product had a pH of about 2.0, an index of refraction of about 1.48, was solid at room temperature and had viscosity at 200° F. of 43,500 centipoises.

EXAMPLE 2

*Ammonium sorbitol monoborate—pH 7.0—Dicondensation product*

The ingredients were mixed in the same proportions and accorded the same treatment as in Example 1. After 2 mols of water of condensation had been volatilized the melt was cooled to 100° C. Then ammonia water containing 28% ammonia was added until a pH of 7.0 was obobtained. Approximately 1.4 mols of $NH_3$ were required due to the loss of part of the ammonia by volatilization. The additional water was driven off by heating, which was carried out in an oven at approximately 115–120° C. to insure uniform distribution of heat throughout the entire mass. The product was liquid at room temperature and had a viscosity of 2,360 centipoises at 200° F.

EXAMPLE 3

*Sodium sorbitol monoborate—pH 10.4—Dicondensation product*

The ingredients were mixed in exactly the same proportions and subjected to the same treatment as in Example 1. After 2 mols of water of condensation had been driven off, the melt was cooled to a temperature below 100° C. Then a 50% solution of sodium hydroxide was added until a pH of 10.4 was obtained. Exactly 1 mol of sodium hydroxide was required. The additional water was driven off by heating which was carried out in an oven at approximately 115–120° C. to insure uniform distribution of heat throughout the entire mass. The product was extremely viscous at room temperature and at 200° F. its viscosity was too high for measurement.

EXAMPLE 4

*Sodium sorbitol monoborate—pH 10.4—Dicondensation product*

91 grams (0.5 mol) of crystalline sorbitol and 47.7 grams (0.125 mol) of sodium tetraborate ($Na_2B_4O_7.10H_2O$) were dissolved in 100 grams of water. This mixture was heated at 110–115° C.

until all of the water of solution and crystallization as well as one mol of water of condensation had been driven off. The final heating was carried out in an oven at 115–120° C. to insure complete and uniform distribution of heat throughout the entire mass. A clear resinous melt, having a pH of 10.4 was obtained. The product was extremely viscous at room temperature and at 200° F. its viscosity was too high for measurement.

Example 5

*Mannitol monoborate—Acidic—Dicondensation product*

182 grams (1 mol) mannitol and 62 grams (1 mol) of boric acid were mixed with 180 grams (10 mols) of water. This mixture was heated at 115–120° C. until two mols of water of condensation were lost as indicated by refractive index of 1.49. The product had a pH of 2.0, was a clear, water white resinous melt at room temperature, was solid and at 200° F. had a viscosity of 13,000 centipoises.

Example 6

*Ammonium mannitol monoborate—pH 7.0—Dicondensation product*

182 grams (1 mol) of mannitol and 62 grams of boric acid were mixed with 180 grams (10 mols) of water. This mixture was heated at 115–120° C. until 2 mols of water of condensation had been given off and the refractive index was about 1.49. The melt was cooled to 100° C. and ammonia water containing 27% ammonia was added until a pH of 7.0 was obtained. Approximately 1.4 mols of $NH_3$ were required due to the loss of ammonia by volatilization. The additional water derived from the neutralization was driven off by heating, which was carried out in an oven at approximately 115–120° C. to insure uniform distribution of heat throughout the entire mass. At room temperature it was a viscous liquid. At 200° F. it had a viscosity of 2,120 centipoises.

Example 7

*Mannitol monoborate—Acidic—Mixtures of di- and tri-condensation products*

182 grams (1 mol) of mannitol and 62 grams (1 mol) of boric acid were mixed with 180 g. (10 mols) of water. The mixture was heated at 115–120° C. for approximately one hour until the refractive index was about 1.515. At this time not only had the water of solution been driven off but also approximately 2.4 mols of water of condensation had volatilized. The product showed a pH of about 2.0 and was a clear, water-white resinous melt. It contained 60% dicondensation product having an empirical formula of $C_6H_{13}O_7B$ and 40% of a tricondensation product having an empirical formula of $C_6H_{11}O_6B$. Tritylation showed two primary alcohol groups open. The product was a solid at room temperature. At 200° F. its viscosity was too high to be measured.

Example 8

*Sorbitol diborate — Acidic — Tetracondensation product*

182 grams (1 mol) of crystalline sorbitol and 124 grams (2.0 mols) of boric acid were mixed with 125 ml. of water. The mixture was heated at 110–115° C. until all of the water of solution as well as 4 mols of water of condensation had volatilized. The final heating was carried out in an oven at 115–120° to insure uniform distribution of heat throughout the entire mass. A clear, resinous melt having a pH of 2.0 was obtained. The product was solid at room temperature. At 200 F. its viscosity was too high to be measured.

Example 9

*Ammonium sorbitol diborate—pH 7.0—Tetracondensation product*

The ingredients were mixed in the same proportions and treated in the same manner as in Example 8. After 4 mols of water of condensation had been driven off the melt was cooled to 100° C., then ammonia water containing 28% $NH_3$ was added until a pH of 7.0 was reached. This required 200 ml. of the ammonia water, essentially 2.8 mols. The mixture was then heated to remove the added water. The final heating was carried out in an oven at 115–120° C. to insure uniform distribution of heat throughout the entire mass. The acetin number of the product showed 2.0 free hydroxyls. The product was a viscous liquid at room temperature and at 200 F. it had a viscosity of 2,390 centipoises.

Example 10

*Sodium sorbitol diborate—pH 7.0—Tetracondensation product*

The ingredients were mixed in the same proportions and treated in the same manner as in Example 8. After 4 mols of water of condensation had been driven off, the melt was cooled to 100° C. Then 1.5 mols of sodium hydroxide were added in the form of a 50% solution, after which the water added by neutralization was driven off by heating. The final heating was carried out in an oven at 115–120° C. to insure uniform distribution of heat throughout the entire mass. The product had two free hydroxyls as determined by acetin number, at room temperature it was extremely viscous and at 200° F. its viscosity was too high for measurement.

Example 11

*Dulcitol monoborate — Acidic — Dicondensation product*

182 grams (1 mol) of dulcitol and 62 g. (1 mol) of boric acid were mixed in 180 g. (10 mols) of water. This mixture was heated at 115–120° C. for approximately one hour until the refractive index was about 1.50. At this time not only had the water of solution been driven off, but 2.0 mols of water of condensation had also volatilized. The acidic borate had a pH value of 2.0. It was a clear resinous melt which crystallized in 24 hours to crystals having a melting point of 148–150° C. The product was solid at room temperature, at 200° F. its viscosity was 57,000 centipoises.

Example 12

*Ammonium dulcitol monoborate—pH 7.0—Dicondensation product*

The ingredients were mixed in the same proportions and accorded the same treatment as in Example 11. After 2.0 mols of water of condensation had been volatilized, the melt was cooled to 100° C. then ammonia water containing 27% $NH_3$ was added until a pH of 7.0 was obtained. Approximately 1.4 mols of $NH_3$ was utilized due to volatilization of part of the ammonia. The additional water was driven off by heating, which was carried out in an oven at approximately 115–120° C. to insure uniform distribution of heat. A clear resinous melt was obtained having a refractive index of approximately 1.481. The product was a very viscous material at room temperature and at 200° F. it was too viscous to be measured with the Hoeppler viscosimeter.

EXAMPLE 13

*Mannitol diborate—Acidic—Tetracondensation product*

182 g. (1 mol) of mannitol and 124 g. (2 mols) of boric acid were mixed with 200 milliliters of water and the mixture heated at 115–120° C. for one hour. The final heating was carried out in an oven to insure uniform distribution of heat throughout the entire mass. At the end of the time the refractive index was about 1.49 and the water of solution as well as approximately 4 mols of water of condensation had volatilized. The product had a pH of about 2.1 and was a clear water-white resinous melt. At room temperature it was a solid resin. At 200° F. its viscosity was too high to be measured.

EXAMPLE 14

*Ammonium mannitol diborate—pH 7.0—Tetracondensation product*

The ingredients were mixed in the same proportions as in Example 13 and were treated in the same manner. After 4.0 mols of water of condensation had volatilized, the melt was cooled to 100° C. Ammonia water containing 27% $NH_3$ was added until a pH of 7.0 was obtained. Approximately 200 ml. of ammonia water was required. The water thus added was volatilized by heating which was carried out in an oven at 115–120° C. to insure uniform distribution of heat throughout the entire mass. A clear melt having a refractive index of about 1.47 was obtained. Tritylation showed 2 free primary alcohol groups while an acetin number showed 2 free hydroxyl groups. The product was a fairly viscous liquid at room temperature and at 200° F. it had a viscosity of 4,330 centipoises.

EXAMPLE 15

*Sodium mannitol diborate—pH 7.0—Tetracondensation product*

The ingredients were mixed in the same proportion as in Example 13 and heated in the same manner. After approximately 4 mols of water of condensation had been volatilized the melt was cooled to 100° C. Then a 50% solution of sodium hydroxide was added until a pH of 7.0 was obtained. Approximately 1.5 mols were required. The water introduced by neutralization was driven off by heating, which was carried out in an oven at 115–120° C. to insure uniform distribution of heat throughout the entire mass. A clear resinous melt having a refractive index of about 1.47 was obtained. At room temperature the product was a highly viscous substance. At 200° F. its viscosity was too high to be measured.

EXAMPLE 16

*Dulcitol diborate—Acidic—Tetracondensation product*

182 g. (1 mol) of dulcitol and 124 g. (2 mols) of boric acid were mixed with 270 g. (15 mols) of water and the mixture was heated one hour at 115–120° C. The final heating was carried out in an oven to insure uniform distribution of heat throughout the entire mass. At the end of this time the refractive index was about 1.48 and the water of solution as well as 4.0 mols of water of condensation had volatilized. The product had a pH of 2.0 and was a clear resin which solidified on standing 24 hours. The product was a solid at room temperature. At 200° F. its viscosity was too high to be measured.

EXAMPLE 17

*Ammonium dulcitol diborate—pH 7.0—Tetracondensation product*

The ingredients were mixed in the same proportions as in Example 16 and were treated in the same manner. After 4.0 mols of water of condensation had been removed the melt was cooled to 100° C. then 200 milliliters of 27% ammonium water (2.8 mols $NH_3$ per mol of dulcitol) were added and a clear resin with a pH of 7.0 was obtained after the water thus added had been removed by heating. The final heating was carried out in an oven at 115–120° C. to insure uniform distribution of heat throughout the entire mass. The melt showed a refractive index of about 1.47. The product was a very viscous material at room temperature and at 200° F. had a viscosity too high to be measured on the viscosimeter.

EXAMPLE 18

*Sodium mannitol monoborate—pH 10.4—Dicondensation product*

36.4 grams (0.2 mol) of mannitol and 19.1 grams (0.05 mol) of sodium tetraborate ($Na_2B_4O_7.10H_2O$) were mixed with 36.4 grams of water and the mixture heated at 110–115° C. until (one hour) all water of solution and of crystallization as well as 7.2 grams (0.4 mol) of water of condensation had been volatilized. The final heating was carried out in an oven at 110–115° C. to insure uniform distribution of heat throughout the entire mass. A clear water-white resinous melt having a pH of 10.4 was obtained. The product was an extremely viscous resinous material at ordinary temperatures. At 200° F. its viscosity was too high to be measured.

EXAMPLE 19

*Sodium mannitol diborate—pH 10.2—Tetracondensation product*

36.4 grams (0.2 mol) of mannitol and 38.2 grams (0.1 mol) of sodium tetraborate were mixed with 36.4 grams of water and the mixture heated at 110–115° C. until (1 hour) all water of solution and of crystallization and 14.4 grams (0.8 mol) of water of condensation had been volatilized. The final heating was carried out in an oven at 110–115° C. to insure uniform distribution of heat throughout the entire mass. A clear water-white resinous melt was obtained having a pH of 10.2. The product was very viscous at room temperature. At 200° F. its viscosity was too high to be measured.

From the foregoing, it will be seen that a new method of preparation of hexahydric alcohol borate polycondensation products and alkali metal salts thereof has been devised which involves the heating of a mixture of boric acid and the hexahydric alcohol or of an alkali metal borate and the hexahydric alcohol to a temperature at which water of condensation is eliminated until the product has a viscosity above 2,000 centipoises, and until at least 2 mols of water of condensation have been removed. It will also be seen that the foregoing method enables the production of solid, easily handled hexahydric alcohol borates without difficulty. The invention further provides a method of manufacture of the alkali metal salts of the hexahydric alcohol borates which are very viscous at room temperature. The invention further contemplates a method of manufacture of the alkali metal salts of the hexahydric alcohol borates which comprises the preparation of the acidic hexahydric alcohol boric acid polycondensation product and neutralizing the same by addition of an alkali metal hydroxide in an amount such as to give a product of the desired pH.

While specific times and temperatures have been given in the above examples, it will be apparent that the invention is not restricted thereto, except insofar as is defined in the claims. Thus, a lower temperature than that specified may be employed, provided a longer time is utilized. Or, the reaction may be carried out at higher temperatures, say up to 140° C. or higher, with a shorter length of time, provided objectionable color is not developed. The details of procedure may be varied with variations in apparatus and circumstances. Thus, while stirring is contemplated in each of the above examples, it may be dispensed with under certain conditions. If desired, an inert gas may be passed through or over the reacting mixture although the preferred temperatures given in the examples are so low that this precaution is not necessary. The reaction is in general conducted at the temperature at which water of condensation is split off and eliminated by boiling. For instance, it may be conducted either at 85° C. at 100 mm. pressure with boiling, or at 100° C. at atmospheric pressure with boiling, or, as shown above, it may be conducted at temperatures above 100° C. at which boiling readily occurs.

In the claims, where I have used the term "boric acid", it is to be understood that I contemplate not only orthoboric acid, but also its equivalents metaboric acid, perboric acid and other boron acids which contain at least one OH group attached to boron, such as tetraboric acid, and other polyboric acids. Similarly, by "alkali metal borates," I refer to the salts of not only orthoboric acid, but to the salts of equivalent boron acids such as perboric acid, metaboric acid, tetraboric acid and all other alkali metal salts of the boric acids referred to.

This application is a continuation in part of my co-pending application Serial No. 149,839, filed June 23, 1937, disclosing and claiming dulcitil and mannitol borates and salts thereof. In this application I claim the method of preparing hexahydric alcohol borate polycondensation products.

Having fully described my invention, what I claim is:

1. A process of preparing resinous, water-soluble, hexahydric alcohol borate polycondensation products which comprises heating a mixture of the hexahydric alcohol and a boron compound selected from the group consisting of boric acid and alkali metal borates to a temperature at which water of condensation is evolved, until at least two mols of water of condensation per mol of boron have been removed and until there is formed a hexahydric alcohol derivative in which the hydrogen atom of at least one secondary alcohol group has been replaced with a boron radical selected from that group of radicals represented by —BRR'; —BR'R², where R is selected from the group consisting of OH and OM, M being an alkali metal, R' is a bond to the oxygen atom and replaces the hydrogen atom of another secondary alcohol group of the hexahydric alcohol, and R² is a bond to the oxygen atom and replaces the hydrogen atom of a third alcohol group of the hexahydric alcohol.

2. A process of preparing resinous, water-soluble, hexahydric alcohol borate polycondensation products which comprises heating a mixture of the hexahydric alcohol and a boron compound selected from the group consisting of boric acid and alkali metal borates to a temperature at which water of condensation is evolved, until at least two mols of water of condensation per mol of boron have been removed and until there is formed a hexahydric alcohol derivative having a viscosity of at least 2000 centipoises at 200° F. and in which the hydrogen atom of at least one secondary alcohol group has been replaced with a boron radical selected from that group of radicals represented by —BRR'; —BR'R², where R is selected from the group consisting of OH and OM, M being an alkali metal, R' is a bond to the oxygen atom and replaces the hydrogen atom of another secondary alcohol group of the hexahydric alcohol, and R² is a bond to the oxygen atom and replaces the hydrogen atom of a third alcohol group of the hexahydric alcohol.

3. A process of preparing resinous, water-soluble, acidic hexahydric alcohol borate polycondensation products which comprises heating a mixture of the hexahydric alcohol and boric acid to a temperature at which water of condensation is evolved, until at least two mols of water of condensation per mol of boric acid have been removed and until there is formed a hexahydric alcohol derivative which upon cooling solidifies to a hard resinous mass and in which the hydrogen atom of at least one secondary alcohol group has been replaced with a boron radical selected from that group of radicals represented by —B(OH)R'; —BR'R², where R' is a bond to the oxygen atom and replaces the hydrogen atom of another secondary alcohol group of the hexahydric alcohol, and R² is a bond to the oxygen atom and replaces the hydrogen atom of a third alcohol group of the hexahydric alcohol.

4. A process of preparing resinous, water-soluble, hexahydric alcohol borate polycondensation products having a pH greater than 2.0 which comprises heating a mixture of the hexahydric alcohol and boric acid to a temperature at which water of condensation is evolved, until at least two mols of water of condensation per mol of boric acid have been removed and until there is formed a melt of a hexahydric alcohol derivative which upon cooling solidifies to a hard resinous mass and in which the hydrogen atom of at least one secondary alcohol group has been replaced with a boron radical selected from that group of radicals represented by —B(OH)R'; —BR'R², where R' is a bond to the oxygen atom and replaces the hydrogen atom of another secondary alcohol group of the hexahydric alcohol, and wherein R² is a bond to the oxygen atom and replaces the hydrogen atom of a third alcohol group of the hexahydric alcohol, and adding to the melt thus obtained an alkali metal hydroxide.

5. A process of preparing resinous, water-soluble, hexahydric alcohol borate polycondensation products having a pH greater than 2.0 which comprises heating a mixture of the hexahydric alcohol and an alkali metal borate to a temperature at which water of condensation is evolved until at least two mols of water of condensation per mol of boron have been removed and until there is formed a hexahydric alcohol derivative in which the hydrogen atom of at least one secondary group has been replaced with a boron radical having the formula —B(OM)R', where M is an alkali metal and R' is a bond to the oxygen atom and replaces the hydrogen atom of another secondary alcohol group of the hexahydric alcohol.

6. A process of preparing resinous, water-soluble, hexahydric alcohol borate polycondensation products which comprises heating a mixture of the hexahydric alcohol and a boron compound selected from the group consisting of boric acid and alkali metal borates in such proportions that from one to two mols of boron are present per mol of hexahydric alcohol, to a temperature at which water of condensation is evolved, until at least two mols of water of condensation per mol of boron have been removed and until there is formed a hexahydric alcohol derivative in which the hydrogen atom of at least one secondary alcohol group has been replaced with a boron radical selected from that group of radicals represented by —BRR'; —BR'R$^2$, where R is selected from the group consisting of OH and OM, M being an alkali metal, R' is a bond to the oxygen atom and replaces the hydrogen atom of another secondary alcohol group of the hexahydric alcohol, and R$^2$ is a bond to the oxygen atom and replaces the hydrogen atom of a third alcohol group of the hexahydric alcohol.

7. A process of preparing resinous, water-soluble, acidic hexahydric alcohol borate polycondensation products which comprises heating a mixture of the hexahydric alcohol and boric acid in the proportions of from one to two mols of boric acid per mol of hexahydric alcohol, to a temperature at which water of condensation is evolved, until at least two mols of water of condensation per mol of boric acid have been removed and until there is formed a hexahydric alcohol derivative which upon cooling solidifies to a hard resinous mass and in which the hydrogen atom of at least one secondary alcohol group has been replaced with a boron radical selected from that group of radicals represented by —B(OH)R'; BR'R$^2$, where R' is a bond to the oxygen atom and replaces the hydrogen atom of another secondary alcohol group of the hexahydric alcohol, and R$^2$ is a bond to the oxygen atom and replaces the hydrogen atom of a third alcohol group of the hexahydric alcohol.

8. A process of preparing resinous, water-soluble hexahydric alcohol-borate polycondensation products having a pH greater than 2.0 which comprises heating a mixture of the hexahydric alcohol and boric acid in the proportions of from one to two mols of boric acid per mol of hexahydric alcohol, to a temperature at which water of condensation is evolved, until at least two mols of water of condensation per mol of boric acid have been removed and until there is formed a melt of a hexahydric alcohol derivative which upon cooling solidifies to a hard resinous mass and in which the hydrogen atom of at least one secondary alcohol group has been replaced with a boron radical selected from that group of radicals represented by —B(OH)R'; —BR'R$^2$, where R' is a bond to the oxygen atom and replaces the hydrogen atom of another secondary alcohol group of the hexahydric alcohol, and wherein R$^2$ is a bond to the oxygen atom and replaces the hydrogen atom of a third alcohol group of the hexahydric alcohol, and adding to the melt thus obtained an alkali metal hydroxide.

9. A process of preparing resinous, water-soluble, hexahydric alcohol monoborate dicondensation products which comprises heating a mixture of the hexahydric alcohol and a boron compound selected from the group consisting of boric acid and alkali metal borates in the proportion of one mol of hexahydric alcohol to one mol of boron present in the mixture, to a temperature at which water of condensation is evolved, until two mols of water of condensation per mol of boron have been removed and until there is formed a hexahydric alcohol derivative in which the hydrogen atom of one secondary alcohol group has been replaced with a boron radical having the formula —BRR', where R is selected from the group consisting of OH and OM, M being an alkali metal and R' is a bond to the oxygen atom and replaces the hydrogen atom of another secondary alcohol group of the hexahydric alcohol.

10. A process of preparing resinous, water-soluble, acidic, hexahydric alcohol monoborate dicondensation products which comprises heating a mixture of the hexahydric alcohol and boric acid in the proportions of one mol of hexahydric alcohol to one mol of boric acid to a temperature at which water of condensation is evolved, until two mols of water of condensation per mol of boric acid have been removed and until there is formed a hexahydric alcohol derivative which upon cooling solidifies to a hard resinous mass and in which the hydrogen atom of one secondary alcohol group has been replaced with a boron radical having the formula —B(OH)R', where R' is a bond to the oxygen atom and replaces the hydrogen atom of another secondary alcohol group of the hexahydric alcohol.

11. A process of preparing resinous, water-soluble, hexahydric alcohol monoborate dicondensation products having a pH greater than 2.0 which comprises heating a mixture of the hexahydric alcohol and boric acid in the proportions of one mol of hexahydric alcohol to one mol of boric acid, to a temperature at which water of condensation is evolved, until two mols of water of condensation per mol of boric acid have been removed and until there is formed a melt of a hexahydric alcohol derivative which upon cooling solidifies to a hard resinous mass and in which the hydrogen atom of one secondary alcohol group has been replaced with a boron radical having the formula —B(OH)R', where R' is a bond to the oxygen atom and replaces the hydrogen atom of another secondary alcohol group of the hexahydric alcohol, and adding to the melt thus obtained an alkali metal hydroxide.

12. A process of preparing resinous, water-soluble, hexahydric alcohol diborate tetracondensation products which comprises heating a mixture of the hexahydric alcohol and a boron compound selected from the group consisting of boric acid and alkali metal borates in the proportion of one mol of hexahydric alcohol to two mols of boron present in the mixture, to a temperature at which water of condensation is evolved, until two mols of water of condensation per mol of boron have been removed and until there is formed a hexahydric alcohol derivative in which the hydrogen atom of two secondary alcohol groups has been replaced with a boron radical having the formula —BRR' where R is selected from the group consisting of OH and OM, M being an alkali metal and R' is a bond to the oxygen atom and replaces the hydrogen atom of another secondary alcohol group of the hexahydric alcohol.

13. A process of preparing resinous, water-soluble, acidic, hexahydric alcohol diborate tetracondensation products which comprises heating a mixture of the hexahydric alcohol and boric acid in the proportions of two mols of boric acid per mol of hexahydric alcohol, to a temperature at which water of condensation is evolved, until two mols of water of condensation per mol of boric acid have been removed and until there is formed a hexahydric alcohol derivative which upon cooling solidifies to a hard resinous mass and in which the hydrogen atom of two secondary alcohol groups has been replaced with a boron radical having the formula —B(OH)R', where R' is a bond to the oxygen atom and replaces the hydrogen atom of another secondary alcohol group of the hexahydric alcohol.

14. A process of preparing resinous, water-soluble, hexahydric alcohol diborate tetracondensation products having a pH greater than 2.0, which comprises heating a mixture of the hexahydric alcohol and boric acid in the proportions of two mols of boric acid per mol of hexahydric alcohol, to a temperature at which water of condensation is evolved, until two mols of water of condensation per mol of boric acid have been removed and until there is formed a melt of a hexahydric alcohol derivative which upon cooling solidifies to a hard resinous mass and in which the hydrogen atom of two secondary alcohol groups has been replaced with a boron radical having the formula —B(OH)R', where R' is a bond to the oxygen atom and replaces the hydrogen atom of another secondary alcohol group of the hexahydric alcohol, and adding to the melt thus obtained an alkali metal hydroxide.

CLARENCE BREMER.